United States Patent
Kadosh

(10) Patent No.: US 10,594,631 B1
(45) Date of Patent: *Mar. 17, 2020

(54) METHODS AND APPARATUS FOR MEMORY RESOURCE MANAGEMENT IN A NETWORK DEVICE

(71) Applicant: Marvell Israel (M.I.S.L) Ltd., Yokneam (IL)

(72) Inventor: Aviran Kadosh, Misgav (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/105,185

(22) Filed: Aug. 20, 2018

Related U.S. Application Data

(63) Continuation of application No. 14/591,827, filed on Jan. 7, 2015, now Pat. No. 10,057,194.

(60) Provisional application No. 61/924,425, filed on Jan. 7, 2014.

(51) Int. Cl.
*H04L 12/28* (2006.01)
*H04L 12/861* (2013.01)

(52) U.S. Cl.
CPC ...... *H04L 49/9005* (2013.01); *H04L 49/9047* (2013.01); *H04L 49/9084* (2013.01)

(58) Field of Classification Search
CPC ....................................................... H04L 12/28
USPC ......................................................... 370/329
See application file for complete search history.

(56) References Cited

U.S. PATENT DOCUMENTS

| | | | |
|---|---|---|---|
| 5,901,139 A | 5/1999 | Shinohara | |
| 6,034,945 A | 3/2000 | Hughes et al. | |
| 6,377,546 B1 | 4/2002 | Guerin et al. | |
| 6,504,818 B1 | 1/2003 | Levine | |
| 6,625,159 B1 | 9/2003 | Singh et al. | |
| 6,658,014 B1 | 12/2003 | Tezuka | |
| 6,687,254 B1 | 2/2004 | Ho et al. | |
| 7,007,071 B1 * | 2/2006 | Brown | H04L 47/30 370/395.7 |
| 7,075,927 B2 | 7/2006 | Mo et al. | |
| 7,120,117 B1 | 10/2006 | Liu | |
| 7,209,440 B1 | 4/2007 | Walsh et al. | |
| 7,245,586 B2 | 7/2007 | Bitar et al. | |
| 7,286,485 B1 | 10/2007 | Ouellette et al. | |

(Continued)

OTHER PUBLICATIONS

Final Office Action in U.S. Appl. No. 14/591,693, dated Dec. 14, 2016 (8 pages).

(Continued)

*Primary Examiner* — Dang T Ton

(57) ABSTRACT

Packets that are to be transmitted via a plurality of egress interfaces of a network device are stored in a memory of the network device. The packets are stored in a plurality of queues that respectively correspond to the egress interfaces. The network device determines a set of queues, from among the plurality of queues, for which packet dropping is enabled. The network device determines whether a utilization level of the memory meets a threshold. In response to determining that the utilization level of the memory meets the threshold: the network device randomly or pseudo-randomly selects a first queue from the set of queues for which packet dropping is enabled, dequeues a first packet from the selected first queue, and deletes the first packet that was dequeued from the selected first queue.

20 Claims, 10 Drawing Sheets

(56) References Cited

U.S. PATENT DOCUMENTS

| | | |
|---|---|---|
| 7,295,564 B2 | 11/2007 | Ling et al. |
| 7,397,809 B2 | 7/2008 | Wang |
| 7,463,630 B2 | 12/2008 | Lee |
| 7,486,689 B1 | 2/2009 | Mott |
| 7,602,720 B2 | 10/2009 | Bergamasco et al. |
| 7,710,969 B2 | 5/2010 | Szczepanek et al. |
| 7,756,991 B2 | 7/2010 | Chen et al. |
| 7,802,028 B2 | 9/2010 | Andersen et al. |
| 7,948,976 B2 | 5/2011 | Arad et al. |
| 8,149,708 B2 | 4/2012 | Oz et al. |
| 8,218,546 B2 | 7/2012 | Opsasnick |
| 8,797,857 B2 | 8/2014 | Dodson et al. |
| 9,112,818 B1 | 8/2015 | Arad et al. |
| 9,838,341 B1 | 12/2017 | Kadosh |
| 9,838,431 B2 * | 12/2017 | Nagaratnam ........... G06F 21/57 |
| 10,057,194 B1 | 8/2018 | Kadosh |
| 10,079,665 B2 * | 9/2018 | Papasakellariou .... H04L 5/0057 |
| 2003/0117958 A1 | 6/2003 | Nation et al. |
| 2003/0223442 A1 | 12/2003 | Huang et al. |
| 2006/0092837 A1 | 5/2006 | Kwan et al. |
| 2006/0215551 A1 | 9/2006 | Narvaez et al. |
| 2007/0253411 A1 | 11/2007 | Arad et al. |
| 2007/0280277 A1 | 12/2007 | Lund |
| 2008/0192765 A1 | 8/2008 | Oh et al. |
| 2012/0213078 A1 | 8/2012 | Kitada |
| 2014/0105218 A1 | 4/2014 | Anand et al. |
| 2016/0077761 A1 | 3/2016 | Stabrawa et al. |
| 2016/0077975 A1 | 3/2016 | Stabrawa et al. |

OTHER PUBLICATIONS

Office Action in U.S. Appl. No. 14/591,693, dated Jun. 9, 2016 (12 pages).

U.S. Appl. No. 14/591,827, Kadosh et al., "Methods and Apparatus for Memory Resource Management in a Network Device," filed Jan. 7, 2015.

Notice of Allowance in U.S. Appl. No. 14/591,693, dated Jul. 31, 2017 (9 pages).

Notice of Allowance in U.S. Appl. No. 14/591,693, dated Mar. 17, 2017 (8 pages).

\* cited by examiner

US 10,594,631 B1

METHODS AND APPARATUS FOR MEMORY RESOURCE MANAGEMENT IN A NETWORK DEVICE

CROSS-REFERENCE TO RELATED APPLICATION

This application is a continuation of U.S. patent application Ser. No. 14/591,827, now U.S. Pat. No. 10,057,194, filed Jan. 7, 2015, entitled "Methods and Apparatus for Memory Resource Management in a Network Device," which claims the benefit of U.S. Provisional Patent Application No. 61/924,425, filed Jan. 7, 2014, entitled "Scheme for Management of Egress Resources." Additionally, this application is related to U.S. patent application Ser. No. 14/591,693, now U.S. Pat. No. 9,838,341, filed Jan. 7, 2015, entitled "Methods and Apparatus for Memory Resource Management in a Network Device." All of the applications referenced above are incorporated herein by reference in their entireties.

FIELD OF THE DISCLOSURE

The present disclosure relates generally to network device, and more particularly, to memory resource management techniques in network devices.

BACKGROUND

Packet processors perform various functions in communication networks, such as packet switching and packet routing. At least some of these functions require a packet processor to temporarily store a copy of a packet while various other processing is performed. If insufficient memory resources are available, the packet processor is unable to store the data packet and the packet may be dropped.

Some network switches utilize memory that is shared by multiple output interfaces, while other network switches have dedicated memory for each output interface. Some network switches utilized a hybrid approach in which output interfaces have dedicated memory, but the output interfaces also share additional memory.

SUMMARY

In an embodiment, a method includes: storing, in a memory of a network device, packets that are to be transmitted via a plurality of egress interfaces of the network device, wherein the packets are stored in a plurality of queues that respectively correspond to the egress interfaces; determining, at the network device, a set of queues, from among the plurality of queues, for which packet dropping is enabled; determining, at the network device, whether a utilization level of the memory meets a threshold; and in response to determining that the utilization level of the memory meets the threshold: randomly or pseudorandomly selecting, at the network device, a first queue from the set of queues for which packet dropping is enabled, dequeuing, at the network device, a first packet from the selected first queue, and deleting, at the network device, the first packet that was dequeued from the selected first queue.

In another embodiment, an apparatus comprises: one or more memory devices; and a packet processor device coupled to the one or more memory devices. The packet processor is configured to: process packets received via ports of a network device including determining to which egress interfaces, among a plurality of egress interfaces, packets are to be forwarded, and enqueue packets to be transmitted in a plurality of queues in the one or more memory devices. The apparatus also comprises: a memory management device coupled to the one or more memory devices. The memory management device is configured to: determine a set of queues, from among the plurality of queues, for which packet dropping is enabled, and determine whether a utilization level of the memory meets a threshold. The memory management device is further configured to: in response to determining that the utilization level of the memory meets the threshold: randomly or pseudorandomly select a first queue from the set of queues for which packet dropping is enabled, dequeue a first packet from the selected first queue, and delete the first packet that was dequeued from the selected first queue.

DETAILED DESCRIPTION

In embodiments disclosed herein, a network device (e.g., a network switch, router, bridge, etc.) utilizes memory management techniques in which a first pool of memory resources is allocated as shared memory (e.g., available for any egress interfaces of the network device), and a second pool of memory resources is allocated as reserved memory (in other words, sub-pools in the reserved memory are reserved for exclusive use by specific egress interfaces). Packets to be transmitted from the network device are stored in queues in the shared memory and/or in the reserved memory, according to some embodiments.

In some embodiments, the second, reserved, pool of memory resources, and/or individual sub-pools within the second, reserved, pool, is/are dynamically expanded, based on a utilization level of the reserved memory, by shrinking the first, shared, pool of memory resources. For example, in an embodiment, a sub-pool in the second pool of memory resources is dynamically expanded by shrinking the first pool of memory resources when the utilization level of the reserved memory reached a threshold. In an embodiment, when the utilization level of the second, reserved, pool of memory falls back below the threshold, a sub-pool in the second pool of memory resources is dynamically shrunk and the first pool of memory resources is expanded with memory resources from the shrunken second pool.

Figure 1:
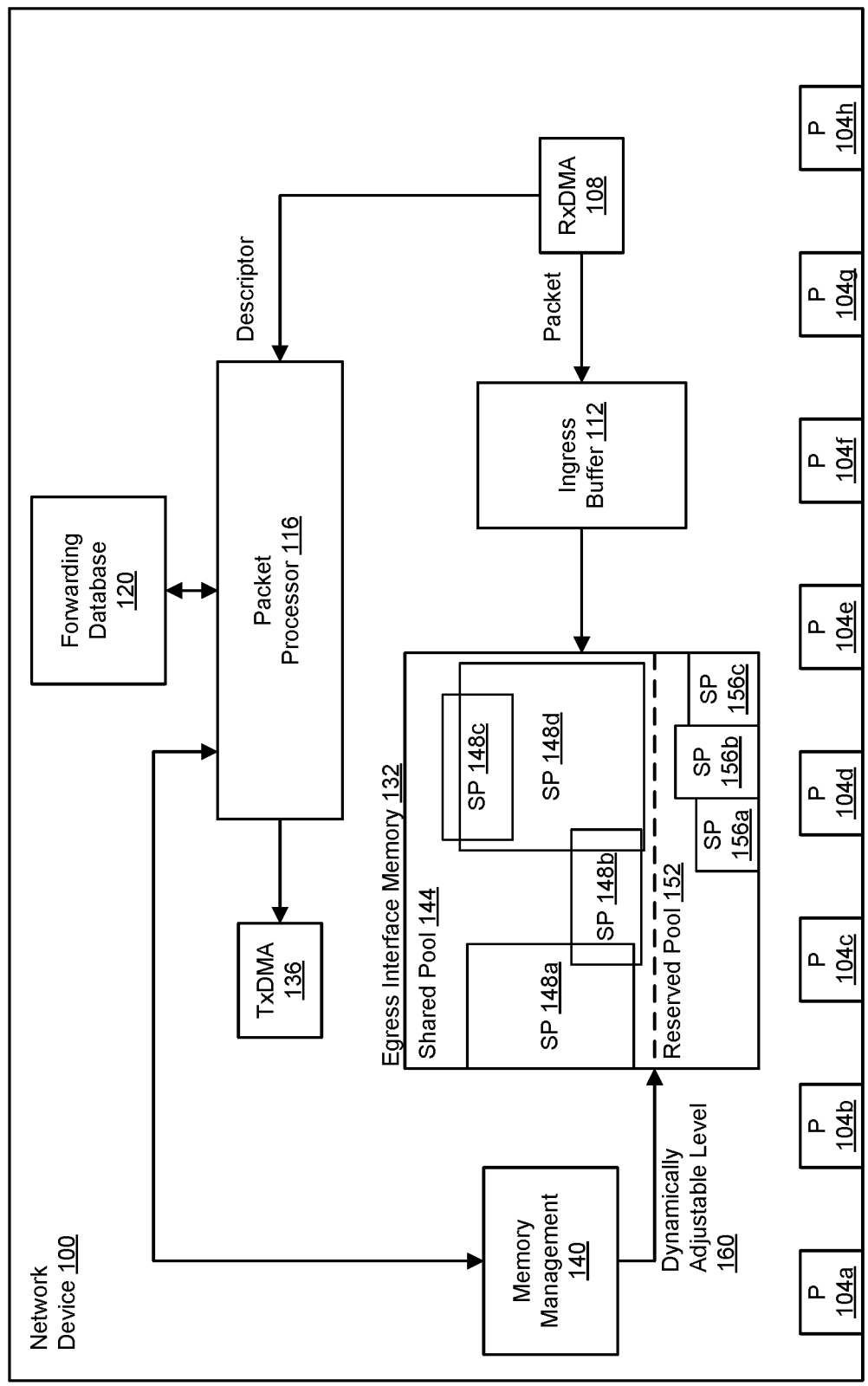
FIG. 1 a block diagram of an example network device that utilizes a dynamically expandable pool of reserved memory resources, according to an embodiment.

FIG. 1 is a block diagram of an example network device 100, according to an embodiment. The network device 100 includes a plurality of ports 104 communicatively coupled to a plurality of network links (not shown). Although eight ports 104 are illustrated in FIG. 1, the network device 100 includes any other suitable number of ports 104 in various embodiments. In situations in which a packet is transmitted by a port 104, the port 104 is an example of an egress interface. Other examples of egress interfaces are described below.

One or more receive direct memory access (RxDMA) devices 108 are coupled to the ports 104 (which coupling is not illustrated in FIG. 1 to avoid obscuring the figure). Each RxDMA device 108 is configured to store a packet that was received via one of the ports 104 in an ingress memory (ingress buffer) 112. In an embodiment, the network device 100 is configured to store packets in the ingress buffer 112 temporarily at least while it is determined via which port or ports 104 the packet is to be transmitted, for instance during the processing of packets. In some embodiments and/or scenarios, the network device 100 determines that a particular packet is to be dropped or transferred to another memory (not shown) for further processing, and in such circumstances the particular packet is removed from the buffer device 112. In various embodiments, the ingress buffer 112 comprises one or more suitable memory devices.

In some embodiments, each RxDMA device 108 is configured to generate a packet descriptor associated with a packet to be processed, in an embodiment. In another embodiment (not shown in FIG. 1), a suitable descriptor generator separate from the RxDMA device(s) 108 generates the packet descriptor. The packet descriptor contains information that a packet processor 116 utilizes to process the associated packet. In some embodiments, the packet descriptor includes an address, a pointer, or other suitable indicator of a location in the ingress buffer 112 at which the associated packet is stored. In some embodiments, the RxDMA device 108 determines the location in the ingress buffer 112 at which the associated packet is to be stored. In other embodiments, the indicator of the location in the ingress buffer 112 at which the associated packet is stored is received from the ingress buffer 112 in response to a write request from the RxDMA device 108.

As discussed above, packet descriptors are provided to the packet processor 116. In some embodiments, the RxDMA device(s) 108 is configured to provide packet headers or portions of packet headers to the packet processor 116 in addition to or instead of packet descriptors. In other embodiments, the RxDMA device(s) 108 is configured to store packet headers or portions of packet headers in the packet descriptors.

The packet processor 116 is configured to analyze a packet descriptor (and/or in some embodiments header information not included in the descriptor) to determine to which one or more of the ports 104 an associated packet is to be forwarded. In an embodiment, the packet processor 116 is coupled to a forwarding database 120 that stores forwarding information (e.g., port information) associated with addresses (e.g., media access control (MAC) addresses, Internet Protocol (IP) addresses, etc.) and/or other suitable information (e.g., virtual local area network (VLAN) identifiers, etc.). In an embodiment, the packet processor 116 is configured to utilize information in the packet descriptor (and/or in some embodiments header information not included in the descriptor) to look up information in the forwarding database 120 that indicates to which one or more ports 104 an associated packet is to be forwarded. In some embodiments, the packet processor 116 is configured to store in the packet descriptor an indication(s) of the determined one or more ports 104.

Additionally, in some embodiments, the packet processor 116 is configured to process a packet descriptor to determine whether and/or how to modify an associated packet (e.g., how to modify a header of an associated packet), in an embodiment. For example, in some scenarios, the packet processor 116 modifies a header of the packet, e.g., to change a next hop address, to add an encapsulating header, to remove an encapsulating header, etc.

After it is determined to which port(s) 104 a packet is to be forwarded, the packet is transferred from the ingress buffer 112 to an egress interface memory 132, at least in some embodiments and/or scenarios. In embodiments in which only a packet payload is stored in the ingress buffer 112, transferring the packet from the ingress buffer 112 to the egress interface memory 132 comprises merging the associated header (output from the packet processor 116) with the payload from the ingress buffer 112, and storing the merged header and payload in the egress interface memory 132. In some embodiments, transferring the packet from the ingress buffer 112 to the egress interface memory 132 also comprises storing the associated descriptor (output from the packet processor 116) in the egress interface memory 132 in association with the packet. In various embodiments, the egress interface memory 132 comprises one or more suitable memory devices.

In some embodiments, the network device 100 is configured to utilize "cut-through" processing for certain packets where payloads of such packets are not transferred to the egress interface memory 132 but rather are forwarded to ports directly from the ingress buffer 112. For example, in some embodiments, cut-through processing is performed on selected packets after a forwarding decision is made based on header information, but before the entire packet is received at an ingress port.

In an embodiment, the egress interface memory 132 is organized as a plurality of egress (or transmit) queues, with different egress queues associated with different ones of the ports 104. Thus, in an embodiment, after it is determined that a packet is to be transmitted via a particular port 104, the packet is transferred to an egress queue (in the egress interface memory 132) corresponding to the particular port 104. As discussed above, however, in some embodiments (e.g., in embodiments utilizing "cut-through" processing for some packets) not all packets are transferred to the egress interface memory 132.

In some embodiments, multiple egress queues are associated with a port 104. For example, different egress queues associated with the same port 104 correspond to different transmit priorities, in some embodiments.

When packet is to be transmitted via a port 104, the packet is read from an associated queue in the egress interface memory 132 (when cut-through processing is not being utilized) and transmitted via the port 104. In some embodiments, one or more transmit direct memory access (TxDMA) devices 136 are utilized to retrieve packets from transmit queues in the egress interface memory 132. For example, in an embodiment, when a packet reaches a head of a transmit queue, a TxDMA device 136 reads the packet from the egress interface memory 132 and provides the packet data (read from the egress interface memory 132) to a port 104 for transmission. In some embodiments, the TxDMA device(s) 136 is configured to read packet data for packets selected for cut-through processing from the ingress buffer 112 and provide such packet data (read from the ingress buffer 112) to ports 104 for transmission.

The network device 100 further includes a memory management device 140 coupled to the packet processor 116 and the egress interface memory 132, according to some embodiments. The memory management device 140 is configured to manage egress queues in the egress interface memory 132, according to some embodiments. When a packet is to be stored in an egress queue, the memory management device 140 allocates storage for the packet in the egress interface memory 132, according to an embodiment. In some embodiments, the memory management device 140 provides the packet processor 116 with location information for storage of the packet in the egress interface memory 132, and the packet processor 116 utilizes the location information to store the packet in the egress interface memory 132.

The memory management device 140 is configured to allocate, in the egress interface memory 132, a first pool 144 (sometimes referred to herein as the shared pool 144) of memory resources as shared memory for a plurality of egress interfaces, according to an embodiment. In various embodiments, egress interfaces include one or more of ports 104, groups of multiple ports 104, trunks, transmit queues, groups of transmit queues, etc. For example, in some embodiments, an egress interface in the plurality of egress interfaces may be a single port with which one or more transmit queues are associated. As another example, in some embodiments, an egress interface in the plurality of egress interfaces may be a single transmit queue.

In an embodiment, available memory in the shared pool 144 is available for any egress interfaces in the plurality of egress interfaces. For instance, in some embodiments, no memory in the shared pool 144 is reserved for any particular egress interface.

In some embodiments, the amount of memory in the shared pool 144 that a particular egress interface is allowed to utilize is limited. In FIG. 1, respective limits for four egress interfaces in the shared pool 144 are illustrated as sub-pools 148. The sub-pools 148 are shown as overlapping to illustrate that shared pool 144 is oversubscribed, according to some embodiments. For example, in some embodiments, an accumulation of all of the sub-pools 148 exceeds the total amount of memory in the shared pool 144.

The memory management device 140 is also configured to allocate, in the egress interface memory 132, a second pool 152 (sometimes referred to herein as the reserved pool 152) of memory resources as reserved memory for at least some of the plurality of packet egress interfaces, according to an embodiment. For example, in some embodiments, the memory management device 140 reserves, in the reserved pool 152, respective sub-pools 156 for exclusive use by respective egress interfaces among the at least some of the plurality of packet egress interfaces.

Figure 2:
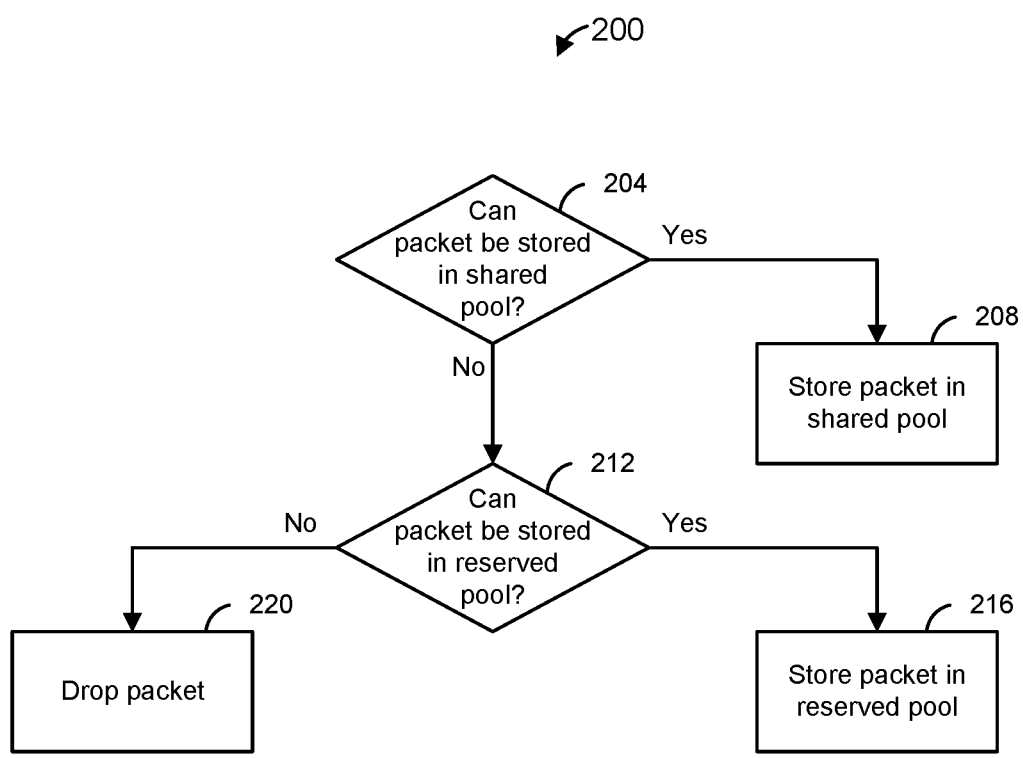
FIG. 2 is a flow diagram of an example method for storing a packet in a memory system of a network device that utilizes a pool of shared memory resources and a pool of reserved memory resources, according to an embodiment.

FIG. 2 is a flow diagram of an example method 200 for memory management in a network device that utilizes a shared pool of an egress memory and a reserved pool in the egress memory, according to an embodiment. The network device 100 is configured to operate according to the method 200, according to an embodiment, and the method 200 is described with reference to FIG. 1 for illustrative purposes. In some embodiments, however, the network device 100 does not operate according to the method 200 and/or the method 200 is implemented by another suitable network device, different than the network device 100, that utilizes a shared pool of in an egress memory and a reserved pool in the egress memory.

At block 204, it is determined initially whether a packet that is to be stored in the egress interface memory 132 can be stored in the shared pool 144. For example, in an embodiment, the memory management device 140 determines whether the packet can be stored in the shared pool 144 based on a utilization level of the shared pool 144. For example, in an embodiment, if the utilization level of the shared pool 144 meets a threshold, it is determined that the packet cannot be stored in the shared pool 144. In some embodiments in which limits on the amount of memory in the shared pool 144 that that can be utilized by different egress interfaces are utilized, it is determined whether a utilization limit for an egress interface to which the packet corresponds has been reached. As an illustrative example, if the packet corresponds to the sub-pool 148*c*, it is determined whether the utilization limit for the sub-pool 148*c* has been reached; and if the utilization limit for the sub-pool 148*c* has been reached, it is determined that the packet cannot be stored in the shared pool 144, according to an embodiment.

If it is determined at block 204 that the packet can be stored in the shared pool 144, the packet is then stored in the shared pool 144 at block 208. On the other hand, if it is determined at block 204 that the packet cannot be stored in the shared pool 144, the flow proceeds to block 212.

At block 212, it is determined whether the packet can be stored in the reserved pool 152. For example, in an embodiment, it is determined whether there is sufficient room for the packet in a reserved sub-pool 156 for the egress interface to which the packet corresponds, according to an embodiment. In some embodiments, it is also determined whether a utilization level of the reserved pool 152 has reached a maximum. As an illustrative example, if the packet corresponds to the sub-pool 156*c*, it is determined whether there is room in the sub-pool 156*c*, and it also determined whether a utilization level of the reserved pool 152 reached the maximum. If is determined that there is not room in the sub-pool 156*c*, or that the utilization level of the reserved pool 152 reached the maximum, it is determined that the packet cannot be stored in the reserved pool 152, according to an embodiment. In other embodiments, if it is determined that there is not room in the sub-pool 156*c*, it is determined that the packet cannot be stored in the reserved pool 152.

If it is determined at block 212 that the packet can be stored in the reserved pool 152, the packet is stored in the reserved pool 152 at block 216. On the other hand, if it is determined at block 212 that the packet cannot be stored in the reserved pool 152, the packet is dropped at block 220. In other embodiments, if it is determined at block 212 that the packet cannot be stored in the reserved pool 152, the reserved pool 152 and/or an individual queue in the reserved pool 152 is dynamically enlarged and the shared pool 144 is dynamically shrunk.

Referring again to FIG. 1, the memory management device 140 is further configured to dynamically expand the reserved pool 152, and/or an individual sub-pool in the reserved pool 152, based on a utilization level of the reserved pool 152 (or of the sub-pool in the reserved pool 152), by shrinking the shared pool 144, according to some embodiments. As an illustrative example, the memory management device 140 is configured to determine when the utilization level of the reserved pool 152 (or of the sub-pool in the reserved pool 152) reaches a threshold and, in response, expand the reserved pool 152, and/or the sub-pool in the reserved pool 152, by shrinking the shared pool 144, according to an embodiment. In FIG. 1, dynamically expanding the reserved pool 152 (and/or the sub-pool within the reserved pool 152) by shrinking the shared pool 144 is illustrated as a dynamically adjustable level 160 between the shared pool 144 and the reserved pool 152.

In some embodiments, the memory management device 140 is further configured to dynamically shrink the reserved pool 152 (and/or the sub-pool in the reserved pool 152), based on the utilization level of the reserved pool 152 (or of the sub-pool in the reserved pool 152), by expanding the shared pool 144, according to some embodiments. As an illustrative example, when the shared pool 144 has been shrunken below an original level, the memory management device 140 is configured to determine when the utilization level of the reserved pool 152 (or of the sub-pool in the reserved pool 152) no longer reaches the threshold and, in response, shrink the reserved pool 152 (and/or the sub-pool in the reserved pool 152) by expanding the shared pool 144, according to an embodiment.

Figure 3:
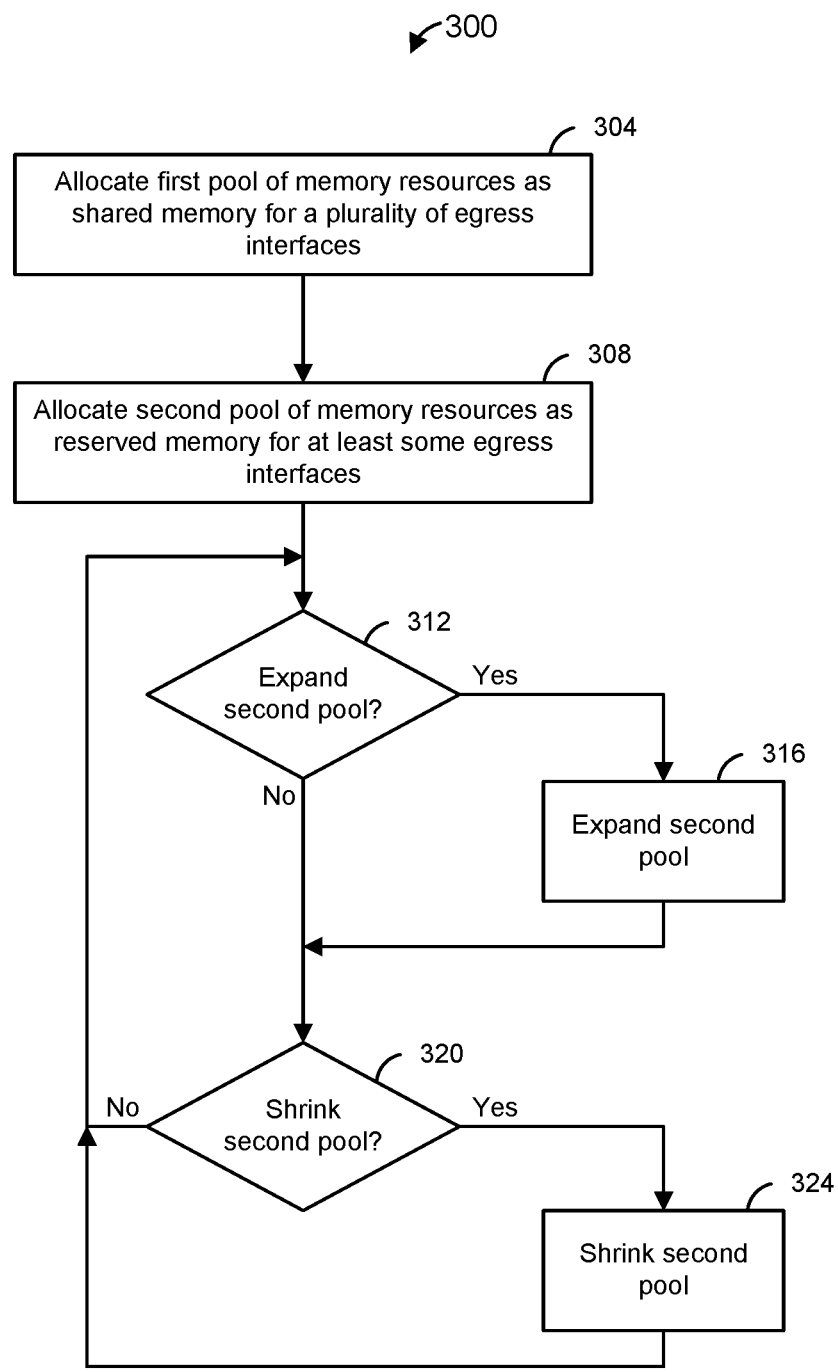
FIG. 3 a flow diagram of an example method for dynamically expanding a pool of reserved memory resources, according to an embodiment.

FIG. 3 is a flow diagram of an example method 300 for memory management in a network device that utilizes a shared pool of in an egress memory and a reserved pool in the egress memory, according to an embodiment. The network device 100 is configured to operate according to the method 300, according to an embodiment, and the method 300 is described with reference to FIG. 1 for illustrative purposes. In some embodiments, however, the network device 100 does not operate according to the method 300 and/or the method 300 is implemented by another suitable network device, different than the network device 100, that utilizes a shared pool of in an egress memory and a reserved pool in the egress memory.

At block 304, the first pool 144 (shared pool) of memory resources is allocated as shared memory for a plurality of egress interfaces. In an embodiment, available memory in the shared pool 144 is available for any egress interfaces in the plurality of egress interfaces. For instance, in some embodiments, no memory in the shared pool 144 is reserved for any particular egress interfaces. In some embodiments, the amount of memory in the shared pool 144 that a particular egress interface is allowed to utilize is limited.

At block 308, the second pool 152 (reserved pool) of memory resources is allocated as reserved memory for at least some of the plurality of packet egress interfaces, according to an embodiment. For example, in some embodiments, the memory management device 140 reserves, in the reserved pool 152, respective sub-pools 156 for exclusive use by respective egress interfaces among the at least some of the plurality of packet egress interfaces.

At block 312, it is determined whether the second pool 152 (reserved pool) should be expanded. For example, it is determined whether the second pool 152 (reserved pool) should be expanded based on a utilization level of the second pool 152, by shrinking the shared pool 144, according to some embodiments. As an illustrative example, the memory management device 140 is configured to determine when the utilization level of the second pool 152 reaches a threshold and, in response, expand the second pool 152, according to an embodiment. In another embodiment, block 312 includes determining whether a sub-pool within the second pool 152 (reserved pool) should be expanded based on a utilization level of the sub-pool. As an illustrative example, the memory management device 140 is configured to determine when the utilization level of the sub-pool in the second pool 152 reaches a threshold and, in response, expand the sub-pool, according to an embodiment.

If it is determined at block 312 that the second pool 152 should be expanded, the flow proceeds to block 316. At block 316, the second pool 152 is expanded. In an embodiment, expanding the second pool 152 comprises shrinking the first pool 144 (shared pool). In an embodiment, expanding the second pool 152 comprises i) expanding a sub-pool within the second pool 152 without expanding one or more other sub-pools within the second pool 152, and ii) shrinking the first pool 144 (shared pool).

At block 320, it is determined whether the second pool 152 (reserved pool) should be shrunk. For example, after one or more packets have been read from the first pool 144 and/or the shared pool 152 and transmitted by the network device 100, the utilization level of the second pool 152 may have dropped. For example, when the first pool 144 has been shrunken below an original level (which corresponds to an amount of memory allocated for the first pool at block 304, according to an embodiment), and when the utilization level of the second pool 152 no longer reaches the threshold, it is determined that the second pool 152 should be shrunken, according to an embodiment. In another embodiment, block 320 includes determining whether a sub-pool within the second pool 152 (reserved pool) should be shrunk based on a utilization level of the sub-pool. As an illustrative example, the memory management device 140 is configured to determine when the utilization level of the sub-pool in the second pool 152 no longer reaches the threshold and, in response, shrink the sub-pool, according to an embodiment.

If it is determined at block 320 that the second pool 152 should be shrunk, the flow proceeds to block 324. At block 324, the second pool 152 is shrunk. In an embodiment, shrinking the second pool comprises expanding the first pool 144 (shared pool). In an embodiment, shrinking the second pool 152 comprises i) shrinking a sub-pool within the second pool 152 without shrinking one or more other sub-pools within the second pool 152, and ii) expanding the first pool 144 (shared pool).

Blocks 312, 316, 320, and 324 are repeated over time (e.g., periodically, when packets are to be stored in the egress interface memory 132, when packets no longer need to be stored in the egress interface memory 132, etc.), according to an embodiment, to thus dynamically expand/shrink the second pool 152 and/or individual sub-pools within the second pool 152.

Referring again to FIG. 1, the egress interface memory 132 is illustrated as having a single first pool 144 (shared pool) and a single second pool 152 (reserved pool). In other embodiments, however, multiple shared pools and/or multiple reserved pools are allocated in an egress interface memory.

Figure 4:
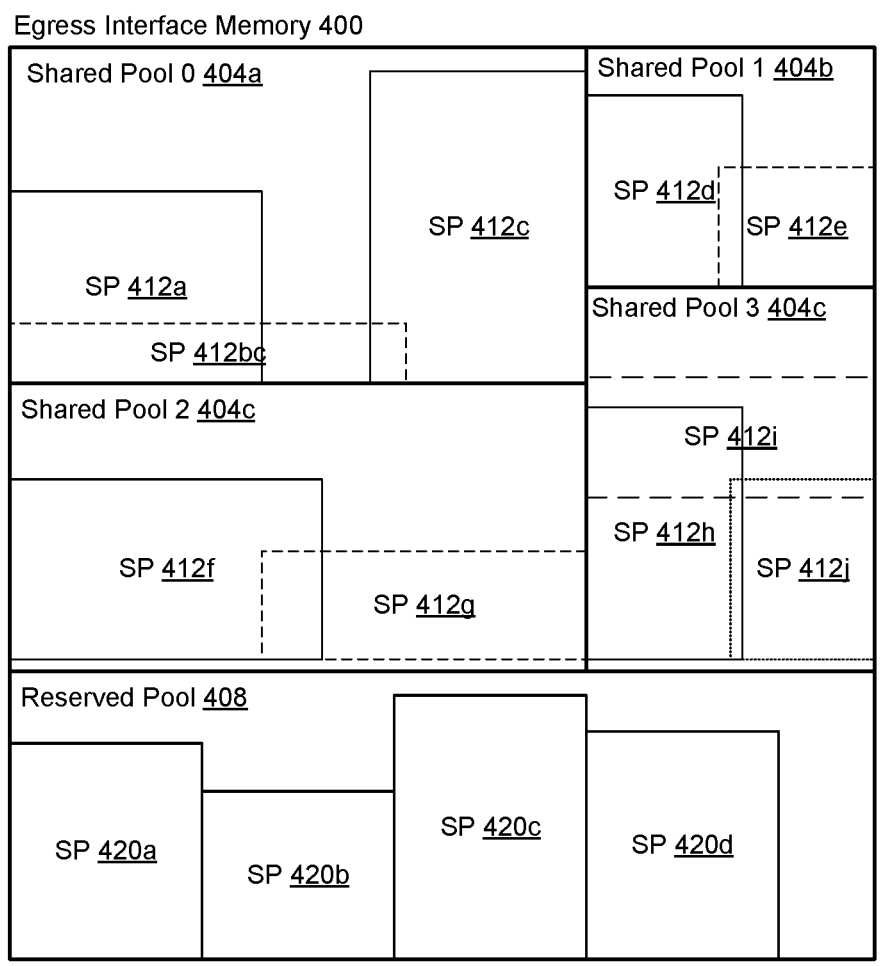
FIG. 4 is a diagram of an example egress interface memory in which a plurality of shared pools and a reserved pool are allocated, according to an embodiment.

FIG. 4 is a diagram schematically illustrating an example allocation of an egress interface memory 400 in which multiple shared pools 404 are allocated, and a single reserved pool 408 is allocated, according to an embodiment. Within each shared pool 404, respective limits for respective egress interfaces are illustrated as sub-pools 412. The sub-pools 412 within each shared pool 404 are shown as overlapping to illustrate that each shared pool 404 is oversubscribed, according to some embodiments. For example, in some embodiments, an accumulation of all of the sub-pools 412 within a single shared pool 404 exceeds the total amount of memory in the shared pool 404.

In some embodiments, the memory management device 140 reserves, in the reserved pool 408, respective sub-pools 420 for exclusive use by respective egress interfaces among the at least some of the plurality of packet egress interfaces.

In some embodiments, the reserved pool 408 is dynamically expanded by shrinking one or more of the shared pools 404.

Referring again to FIG. 1, in an embodiment, the network device 100 is configured to allocate multiple shared pools in the egress interface memory 132, in a manner similar to the illustrative embodiment of FIG. 4. Although four shared pools 404 are illustrated in FIG. 4, in various embodiments, other suitable numbers of shared pools 404 are utilized, such as two, three, five, six, seven, eight, etc.

In an embodiment, allocation of one or more shared pools and allocation of the reserved pool includes setting values of a plurality of parameters. For example, according to an illustrative embodiment, the following parameters are set:

an initial value of $TP_j$ for each shared pool j, where $TP_j$ is the size of the j-th shared pool;

$MaxTP_j$ is set to the initial value of $TP_j$ for each shared pool j, where $MaxTP_j$ is the maximum size of the j-th shared pool; and an initial value of $TG_{OS}$, where $TG_{OS}$ is the size of the reserved pool.

In an illustrative embodiment, other parameter values are set for use in example methods performed by the memory management device 140. For example in an embodiment, the following parameters are set:

$G_i$ for each egress interface i, where $G_i$ corresponds to an amount of memory resources reserved for use for the i-th interface;

$\alpha_{ij}$ for each egress interface i corresponding to a shared pool j, where $\alpha_{ij}$ corresponds to a maximum amount of resources in shared pool j that can be used by the i-th interface;

in an embodiment, the initial value of $TG_{OS}$ is set according to:

$$TG_{OS}=\max\{0,1/F(\Sigma G_i)-(U-m)\}, \quad \text{Equ. 1}$$

where $$U=TP_j/(1+\Sigma \alpha_{ij}), \quad \text{Equ. 2}$$

the summations in Equations 1 and 2 are over all i, F is an oversubscription factor, m is a margin factor, U is an indication of unused space in the shared pool j, and $TG_{OS}$ is a size of the reserved pool.

The parameters discussed above are utilized in illustrative embodiments of methods described further below.

Figure 5A:
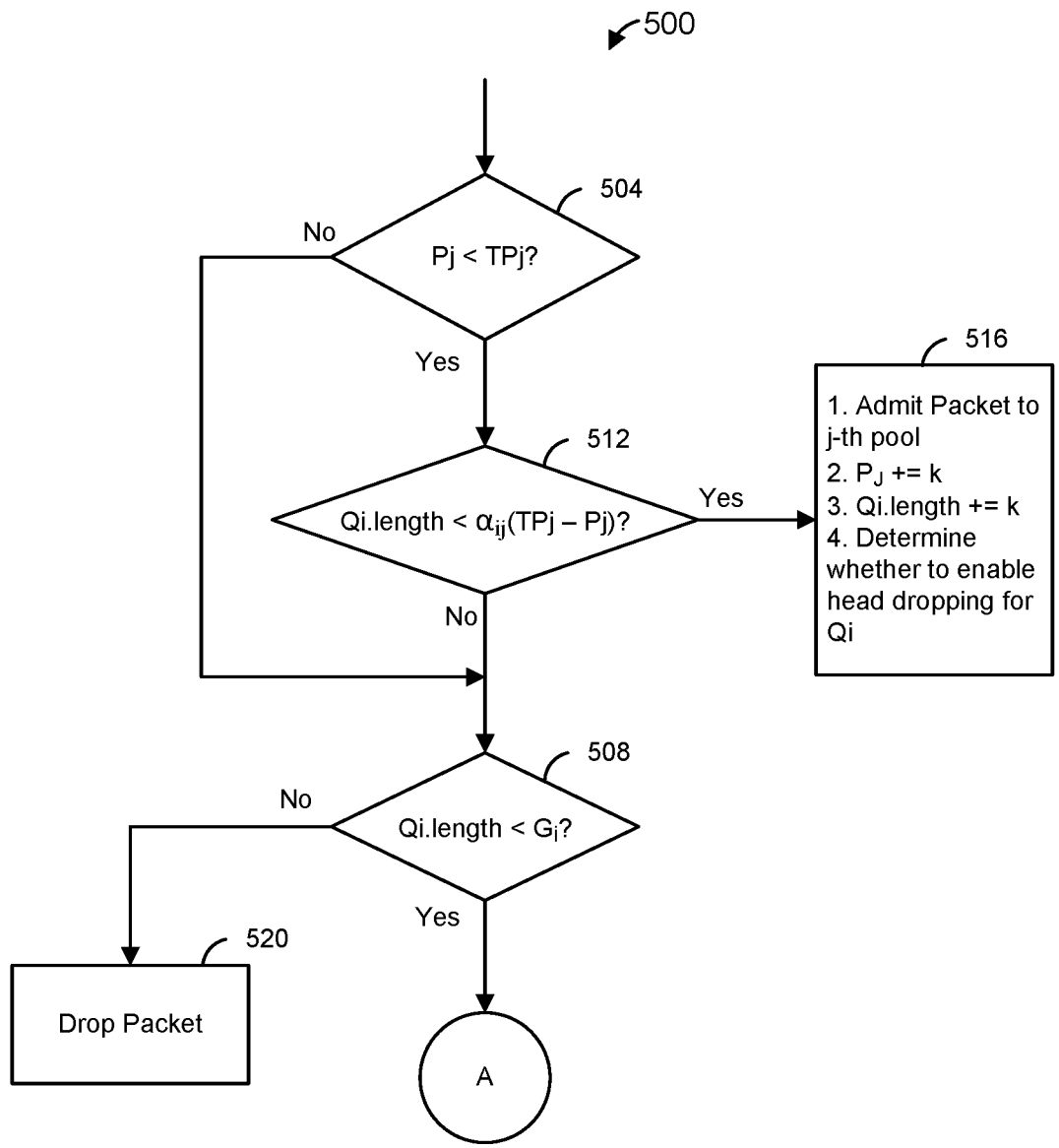
FIGS. 5A and 5B are a flow diagram of an example method for determining whether to store a packet in a pool of shared memory resources or a pool of reserved memory resources, and for dynamically expanding the pool of reserved memory resources, according to an embodiment.
Figure 5B:
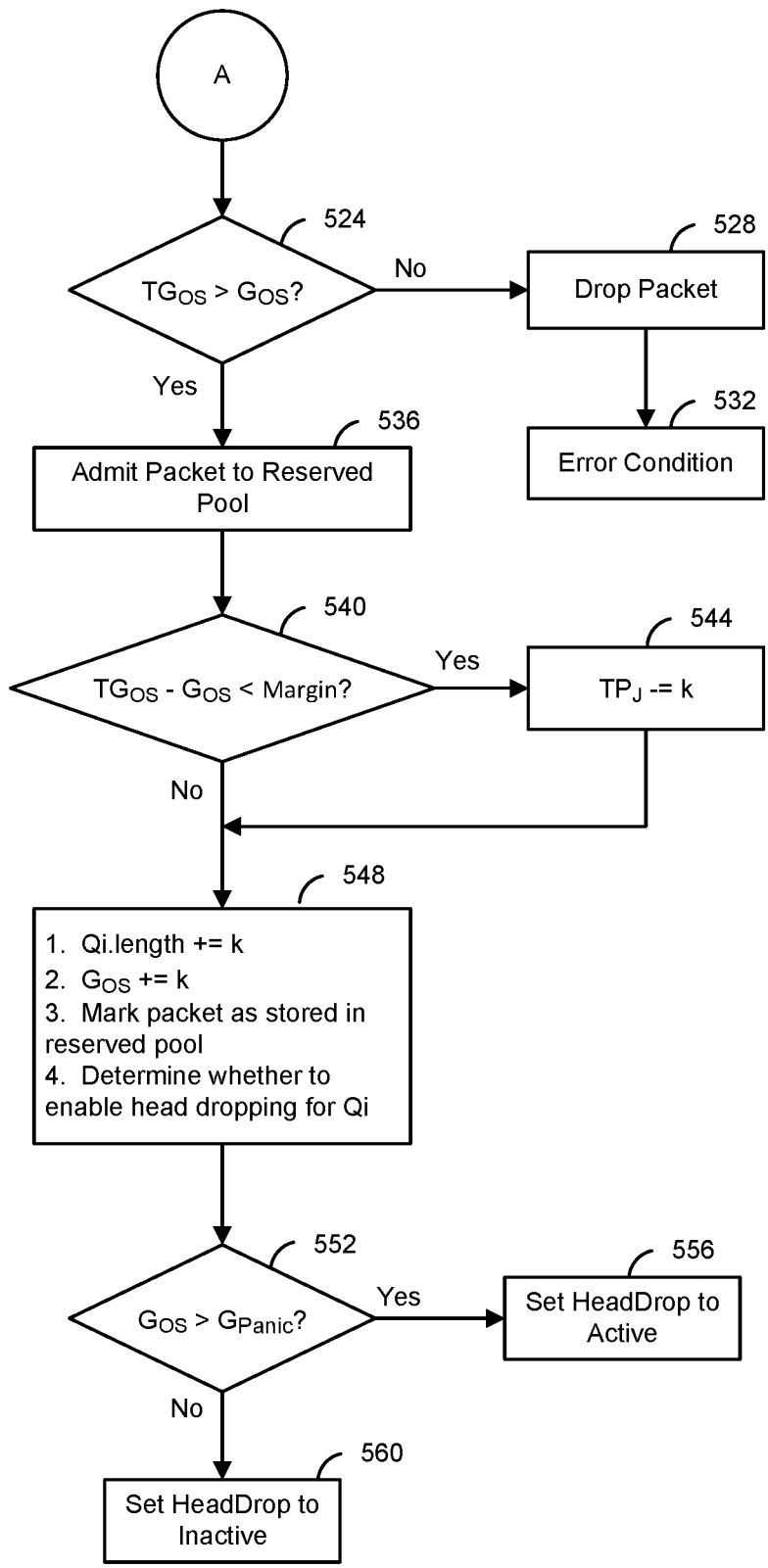

For example, FIGS. 5A and 5B are a flow diagram of an example method 500 that is implemented each time a packet is to be stored in the egress interface memory 400, according to an embodiment. Thus, in some embodiments, the memory management device 140 is configured to implement the method 500. In other embodiments, the memory management device 140 implements another suitable method and/or the method 500 is implemented by another suitable component of a network device.

In the description of the method 500 below, it is assumed that the packet corresponds to an i-th egress interface, which corresponds to the j-th pool.

At block 504, it is determined whether occupied space in the j-th pool ($P_j$) is less than the current allocated size of the j-th pool ($TP_j$). If it is determined that occupied space in the j-th pool ($P_j$) is not less than the current allocated size of the j-th pool ($TP_j$), the flow proceeds to block 508, which generally correspond to a beginning of a determination of whether the packet can be stored in the reserved pool. Block 508 will be described in more detail below.

On the other hand, if it is determined at block 504 that occupied space in the j-th pool ($P_j$) is less than the current allocated size of the j-th pool ($TP_j$), the flow proceeds to block 512. At block 512, it is determined whether an amount of occupied space corresponding to the i-th interface (Qi) is less than $\alpha_{ij}(TP_j-P_j)$, where $TP_j-P_j$ corresponds to an amount of free space in the j-th shared pool. If it is determined at block 512 that the amount of occupied space corresponding to the i-th interface (Qi) is less than $\alpha_{ij}(TP_j-P_j)$, then the flow proceeds to block 516.

At block 516, the packet is admitted for storage in the j-th shared pool. The parameter $P_j$ indicating the amount of occupied space in the j-th pool is updated to reflect storage of the packet, having length k, in the j-th shared pool. Similarly, parameter Qi.length indicating the amount of occupied space corresponding to the i-th interface is updated to reflect storage of the packet, having length k. Additionally, it is determined whether to enable head dropping for the stored packets corresponding to the i-th interface. An example technique for determining whether to enable head dropping for an i-th interface is described below.

On the other hand, if it is determined at block 512 that the amount of occupied space for the i-th interface (Qi) is not less than $\alpha_{ij}(TP_j-P_j)$, then the flow proceeds to block 508. At block 508, it is determined whether the amount of occupied space for the i-th interface (Qi.length) is less than amount of memory resources reserved for use for the i-th interface ($G_i$). If it is determined at block 508 that amount of occupied space for the i-th interface (Qi) is not less than amount of memory resources reserved for use for the i-th interface ($G_i$), the packet is dropped at block 520.

On the other hand, if it is determined at block 508 that the amount of occupied space for the i-th interface (Qi) is less than amount of memory resources reserved for use for the i-th interface ($G_i$), the flow proceeds to block 524. At block 524, it is determined whether the current size of the reserved pool ($TG_{OS}$) is greater than an amount of occupied space in the reserved pool ($G_{OS}$). If it is determined at block 524 that the current size of the reserved pool ($TG_{OS}$) is not greater than the amount of occupied space in the reserved pool ($G_{OS}$), the flow proceeds to block 528. At block 528, the packet is dropped. At block 532, an error condition is indicated. For example, in an embodiment, an interrupt is asserted at block 532. In an embodiment, if it is determined at block 524 that the current size of the reserved pool ($TG_{OS}$) is not greater than the amount of occupied space in the reserved pool ($G_{OS}$), this indicates that the current size of the reserved pool ($TG_{OS}$) is not sufficient.

On the other hand, if it is determined at block 524 that the current size of the reserved pool ($TG_{OS}$) is greater than the amount of occupied space in the reserved pool ($G_{OS}$), the flow proceeds to block 536. At block 536, the packet is admitted for storage in the reserved pool.

At block 540, it is determined whether an amount of available space in the reserved pool ($TG_{OS}-G_{OS}$) is less than a threshold (margin). Block 540 is an illustrative embodiment of analyzing a utilization level of the reserved pool. If it is determined at block 540 that available space in the reserved pool ($TG_{OS}-G_{OS}$) is less than the threshold (margin), the flow proceeds to block 544. At block 544, the current allocated size of the j-th pool ($TP_j$) is reduced by the size (k) of the packet. Block 544 is an illustrative embodiment of expanding the reserved pool by shrinking the j-th shared pool. Blocks 540 and 544 are an illustrative embodiment of dynamically expanding the reserved pool, based on a utilization level of the reserved pool, by shrinking the j-th shared pool.

After block 544, or if it is determined at block 540 that the amount of available space in the reserved pool ($TG_{OS}$–$G_{OS}$) is not less than the threshold (margin), the flow proceeds to block 548. At block 548, the amount of occupied space for the i-th interface (Qi.length) is updated by the size k of the packet. Similarly, the amount of occupied space in the reserved pool ($G_{OS}$) is updated by the size k of the packet.

Also at block 548, the packet is marked as having been stored in the reserved pool. Additionally, it is determined whether to enable head dropping for the stored packets corresponding to the i-th interface. An example technique for determining whether to enable head dropping for an i-th interface is described below.

At block 552, it is determined whether the amount of occupied space in the reserved pool ($G_{OS}$) is greater than a threshold ($G_{panic}$). If it is determined at block 552 that the amount of occupied space in the reserved pool ($G_{OS}$) is greater than a threshold ($G_{panic}$), this may indicate that the egress interface memory 140 is in danger of becoming full. Thus, the flow proceeds to block 556. At block 556, a parameter HeadDrop is set to active to indicate that the memory management device 140 should perform a head drop procedure to begin dropping packets stored in the egress interface memory 132. An illustrative embodiment of a head drop procedure is described below.

On the other hand, if it is determined at block 552 that the amount of occupied space in the reserved pool ($G_{OS}$) is not greater than the threshold ($G_{panic}$), the flow proceeds to block 560. At block 560, the parameter HeadDrop is set to inactive to indicate that the memory management device 140 need not perform the head drop procedure.

Figure 6:
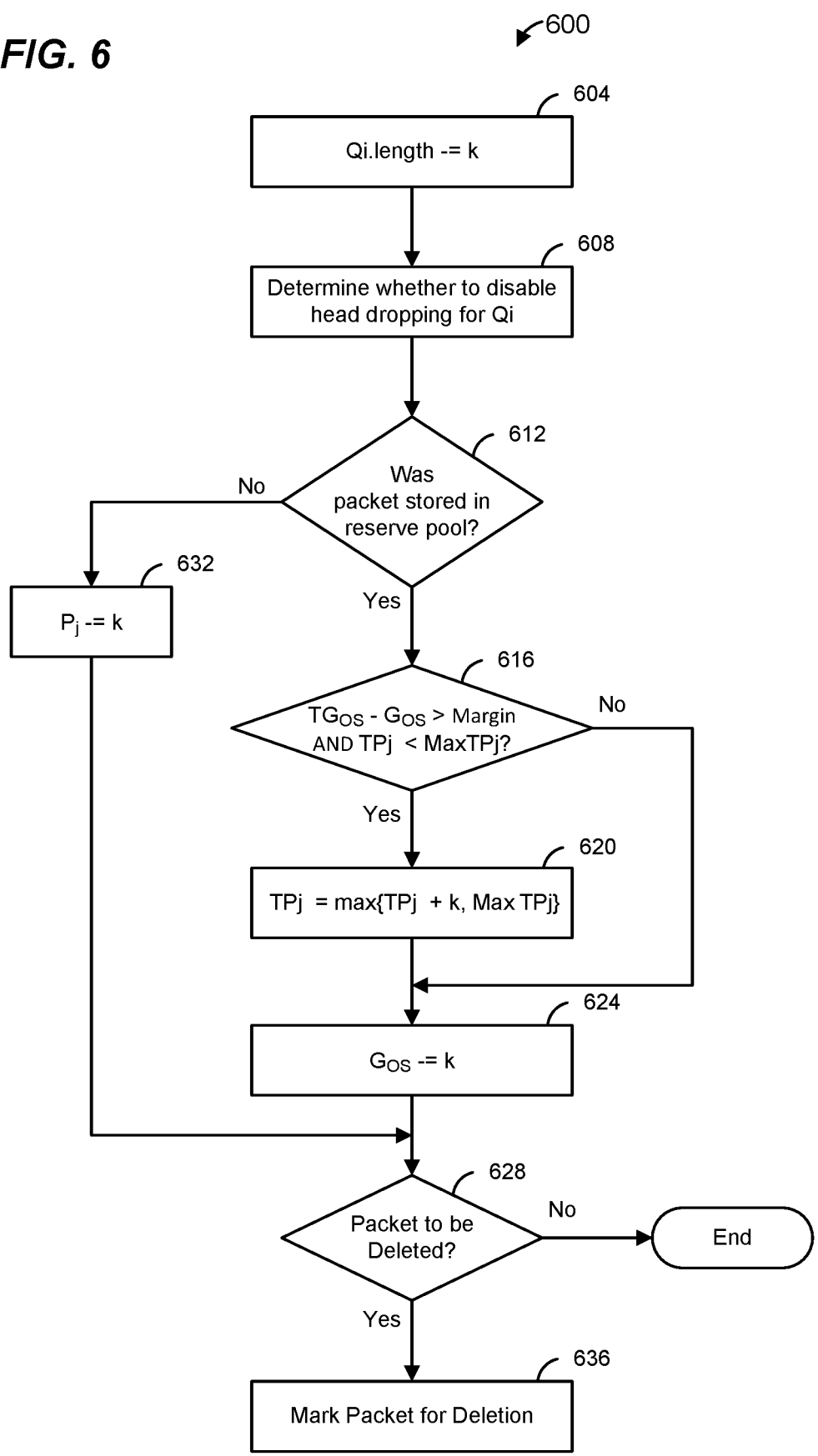
FIG. 6 a flow diagram of an example method for managing a shared pool of memory resources and a reserved pool of memory resources when a packet is retrieved from a memory, according to an embodiment.

FIG. 6 is a flow diagram of an example method 600 that is implemented each time a packet is retrieved from the egress interface memory 400 (e.g., for transmission of the packet, for deletion of the packet, etc.), according to an embodiment. In some embodiments, the memory management device 140 is configured to implement the method 600. In other embodiments, the memory management device 140 implements another suitable method and/or the method 600 is implemented by another suitable component of a network device.

In the description of the method 600 below, it is assumed that the packet corresponds to an i-th egress interface, which corresponds to the j-th pool. Additionally, it is assumed that the packet has a length of k.

At block 604, the amount of occupied space for the i-th interface (Qi.length) is updated by the size k of the packet. At block 608, it is determined whether to disable head dropping for the stored packets corresponding to the i-th interface. An example technique for determining whether to disable head dropping for an i-th interface is described below.

At block 612, it is determined whether the packet was stored in the reserved pool. For example, in embodiments in which packets that are stored in the reserved pool are marked, block 612 comprises determining whether the packet was marked as being stored in the reserved pool. In other embodiments, other suitable techniques for determining whether the packet was stored in the reserved pool are utilized.

If it is determined at block 612 that the packet was stored in the reserved pool, the flow proceeds to block 616. At block 616, it is determined whether the amount of available space in the reserved pool ($TG_{OS}$–$G_{OS}$) is greater than the threshold (margin) AND the current size of the j-th shared pool ($TP_j$) is less than the maximum size of the j-th shared pool ($MaxTP_j$). If it is determine that the reserved pool ($TG_{OS}$–$G_{OS}$) is greater than the threshold (margin) AND the current size of the j-th shared pool ($TP_j$) is less than the maximum size of the j-th shared pool ($MaxTP_j$), the flow proceeds to block 620.

At block 620, the current size of the j-th shared pool ($TP_j$) is set to the maximum of $TP_j$+k or $MaxTP_j$. After block 620, or if it is determined at block 616 that either the reserved pool ($TG_{OS}$–$G_{OS}$) is not greater than the threshold (margin) AND/OR the current size of the j-th shared pool ($TP_j$) is not less than the maximum size of the j-th shared pool ($MaxTP_j$), the flow proceeds to block 624.

At block 624, the amount of occupied space in the reserved pool ($G_{OS}$) is updated by the size k of the packet. The flow then proceeds to block 628.

Referring again to block 612, if it is determined that the packet was not stored in the reserved pool, the flow proceeds to block 632. At block 632, the amount of occupied space in the j-th shared pool ($P_j$) is updated by the size k of the packet. The flow then proceeds to block 628.

At block 628, it is determined whether the packet is to be deleted. If it is determined at block 628 that the packet is to be deleted, the packet is marked for deletion at block 636. This instructs another component of the network device 100, for example, to delete the packet. On the other hand, if it is determined at block 628 that the packet is not to be deleted, the flow ends.

Figure 7:
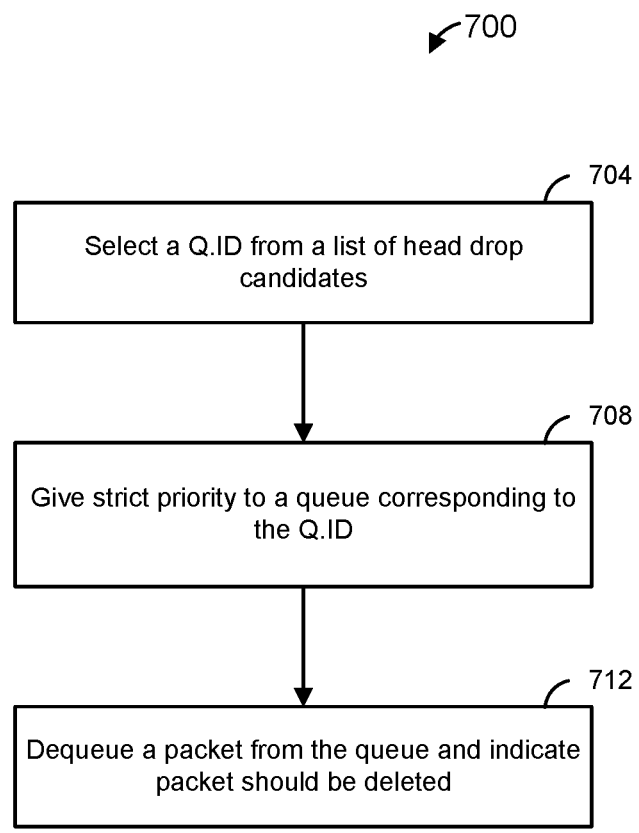
FIG. 7 a flow diagram of an example method for performing a head drop operation, according to an embodiment.

FIG. 7 is a flow diagram of an example method 700 for deleting packets from the egress interface memory 400 according to a head dropping procedure, according to an embodiment. In some embodiments, the memory management device 140 is configured to implement the method 700. In other embodiments, the memory management device 140 implements another suitable method and/or the method 700 is implemented by another suitable component of a network device. For example, in an embodiment, the method 700 is implemented by a scheduler device of the network device 100, where the scheduler device is configured to schedule packets for transmission from ports of the network device 100.

At block 704, an egress interface (Q.ID) is selected from a list of candidate egress interfaces for which head dropping is enabled. In an embodiment, the egress interface is randomly or pseudo-randomly selected from the list. In other embodiments, other suitable techniques are used additionally or alternatively to select the egress interface from the list.

At block 708, a queue corresponding to the select egress interface (Q.ID) is given strict priority. In an embodiment, giving strict priority to the queue enables fast dequeuing of packets from the queue. At block 712, a packet is dequeued from the queue and with an indication that the dequeued packet should be deleted.

Figure 8:
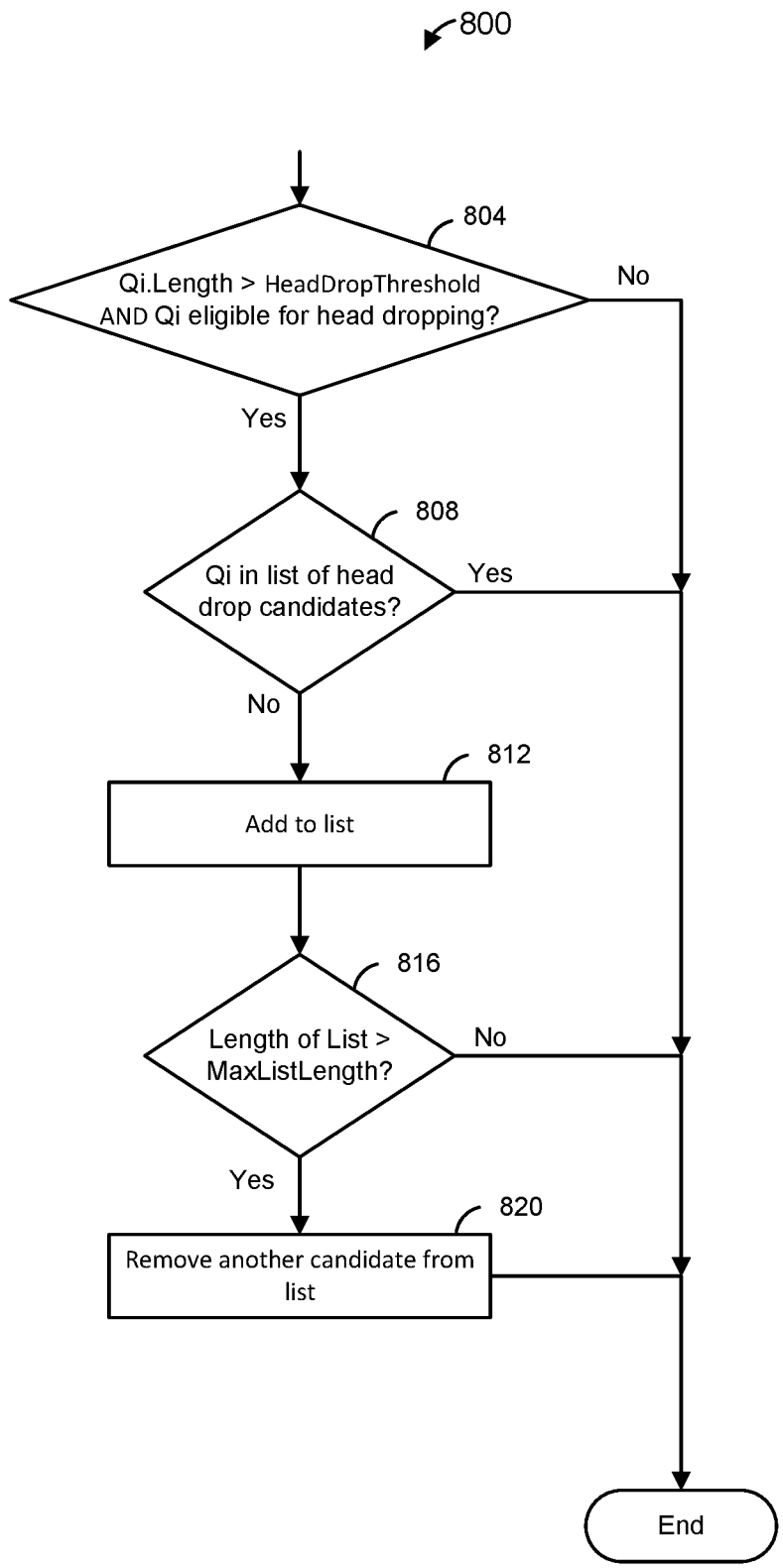
FIG. 8 a flow diagram of an example method for determining whether head dropping should be enabled for an egress interface, according to an embodiment.

FIG. 8 is a flow diagram of an example method 800 for determining whether head dropping should be enabled for an i-th egress interface, according to an embodiment. In some embodiments, the memory management device 140 is configured to implement the method 800. In other embodiments, the memory management device 140 implements another suitable method and/or the method 800 is implemented by another suitable component of a network device.

At block 804, it is determined whether the amount of occupied space for the i-th interface (Qi.length) is greater than a threshold (HeadDropThreshold) AND if the i-th interface is eligible for head dropping. For example, in some embodiments, selected egress interfaces may be configured such that head dropping is not permissible for the selected egress interfaces. As another example, in some embodiments, egress interfaces may be associated with a priority, and configuration information indicates that head dropping is not permissible for certain priorities.

If it is determined at block 804 that the amount of occupied space for the i-th interface (Qi.length) is not greater than the threshold (HeadDropThreshold) AND/OR that the i-th interface is not eligible for head dropping, the flow ends. On the other hand, if it is determined at block 804 that the amount of occupied space for the i-th interface (Qi.length) is greater than the threshold (HeadDropThreshold) AND the i-th interface is eligible for head dropping, the flow proceeds to block 808.

At block 808, it is determined if an indicator of the i-th interface is already included in a list of egress interfaces that are enabled for head dropping. If it is determined at block 808 that the indicator of the i-th interface is already included in the list of egress interfaces that are enabled for head dropping, the flow ends. On the other hand, if it is determined at block 808 that the indicator of the i-th interface is not already included in the list of egress interfaces that are enabled for head dropping, the flow proceeds to block 812. At block 812, the indicator of the i-th interface is added to the list of egress interfaces that are enabled for head dropping.

At block 816, it is determined if a length of the list of egress interfaces is greater than a maximum list length (MaxListLength). If it is determined at block 816 that the length of the list of egress interfaces is not greater than the maximum list length (MaxListLength), the flow ends. On the other hand, if it is determined at block 816 that the length of the list of egress interfaces is greater than the maximum list length (MaxListLength), the flow proceeds to block 820.

At block 820, another indicator corresponding to another egress interface in the list is selected and removed from the list. In an embodiment, the other indicator corresponding to other egress interface in the list is randomly or pseudo-randomly selected from the list. In other embodiments, other suitable techniques are used additionally or alternatively to select the other indicator corresponding to other egress interface from the list.

Figure 9:
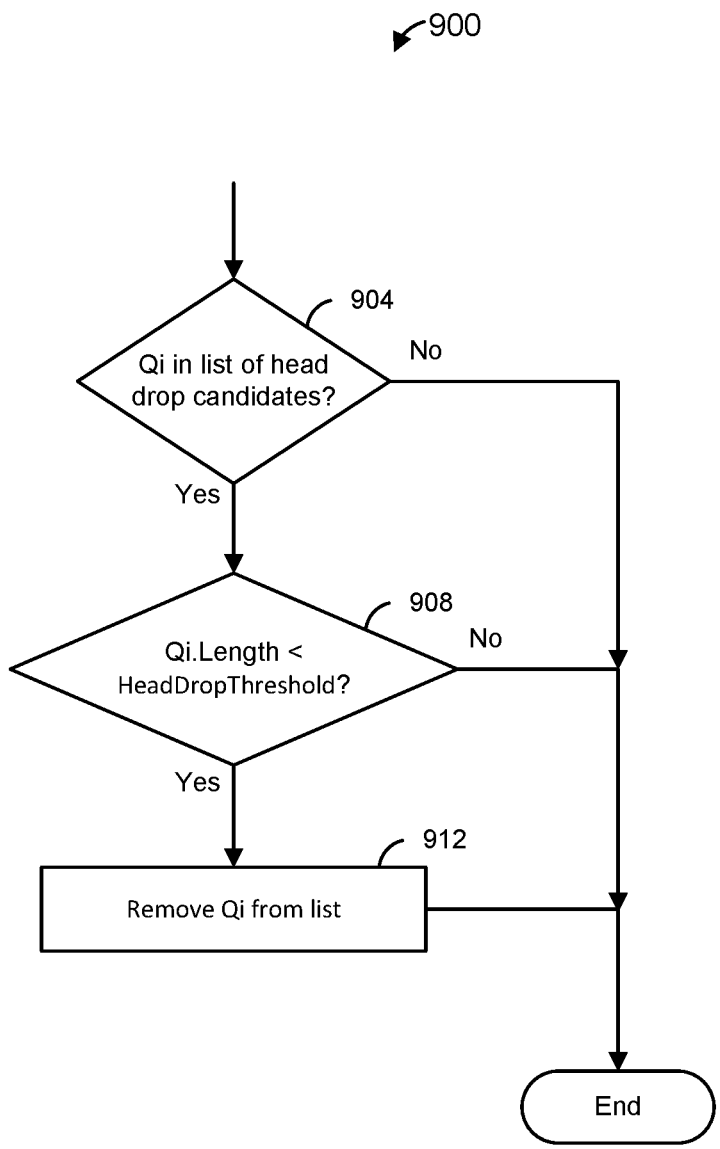
FIG. 9 a flow diagram of an example method for determining whether head dropping should be disabled for an egress interface, according to an embodiment.

FIG. 9 is a flow diagram of an example method 900 for determining whether head dropping should be disabled for an i-th egress interface, according to an embodiment. In some embodiments, the memory management device 140 is configured to implement the method 900. In other embodiments, the memory management device 140 implements another suitable method and/or the method 900 is implemented by another suitable component of a network device.

At block 904, it is determined if an indicator of the i-th interface is included in the list of egress interfaces that are enabled for head dropping. If it is determined at block 904 that the indicator of the i-th interface is not included in the list of egress interfaces that are enabled for head dropping, the flow ends. On the other hand, if it is determined at block 904 that the indicator of the i-th interface is included in the list of egress interfaces that are enabled for head dropping, the flow proceeds to block 908.

At block 908, it is determined whether the amount of occupied space for the i-th interface (Qi.length) is less than the threshold (HeadDropThreshold). If it is determined at block 908 that the amount of occupied space for the i-th interface (Qi.length) is not less than the threshold (HeadDropThreshold), the flow ends. On the other hand, if it is determined at block 908 that the amount of occupied space for the i-th interface (Qi.length) is less than the threshold (HeadDropThreshold), the flow proceeds to block 912.

At block 912, an indicator corresponding to the i-th egress interface is removed from the list.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any non-transitory computer readable medium or media such as a magnetic disk, an optical disk, a random access memory (RAM), a read only memory (ROM), a flash memory, a magnetic tape, etc. The software or firmware instructions may include machine readable instructions that, when executed by one or more processors, cause the processor to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method, comprising:
   storing, in a memory of a network device, packets that are to be transmitted via a plurality of egress interfaces of the network device, wherein the packets are stored in a plurality of queues that respectively correspond to the egress interfaces;
   determining, at the network device, a set of queues, from among the plurality of queues, for which packet dropping is enabled;
   determining, at the network device, whether a utilization level of the memory meets a threshold; and
   in response to determining that the utilization level of the memory meets the threshold:
      randomly or pseudorandomly selecting, at the network device, a first queue from the set of queues for which packet dropping is enabled,
      dequeuing, at the network device, a first packet from the selected first queue, and
      deleting, at the network device, the first packet that was dequeued from the selected first queue.

2. The method of claim 1, wherein:
   the threshold is a first threshold; and
   determining the set of queues for which packet dropping is enabled comprises, for each of at least some queues among the plurality of queues:
      determining, at the network device, whether an amount of occupied memory corresponding to the queue meets a second threshold, and
      including the queue among the set of queues for which packet dropping is enabled based on whether the amount of occupied memory corresponding to the queue meets the second threshold.

3. The method of claim 2, wherein including the queue among the set of queues for which packet dropping is enabled further based on whether configuration information associated with the queue indicates that dropping packets in the queue is permitted.

4. The method of claim 1, further comprising:
allocating, at the network device, a first pool of memory resources of the memory as shared memory for a plurality of egress interfaces, wherein available memory in the shared memory is available for any egress interfaces in the plurality of egress interfaces;
allocating, at the network device, a second pool of memory resources of the memory as reserved memory for at least some of the plurality of egress interfaces, including reserving, in the reserved memory, respective sub-pools for exclusive use by respective egress interfaces among the at least some of the plurality of egress interfaces; and
for each of at least some of the queues, allocating, at the network device, a respective amount of the shared memory and a respective sub-pool in the reserved memory.

5. The method of claim 4, further comprising:
determining, at the network device, whether the first packet is stored in the reserved memory; and
wherein dequeuing the first packet from the selected first queue is performed in response to determining that the first packet is stored in the reserved memory.

6. The method of claim 5, further comprising, in response to determining that the utilization level of the memory meets the threshold:
randomly or pseudorandomly selecting, at the network device, a second queue from the set of queues for which packet dropping is enabled;
determining, at the network device, whether the second packet is stored in the reserved memory;
in response to determining that the second packet is stored in the reserved memory:
dequeuing, at the network device, a second packet from the selected second queue, and
deleting, at the network device, the second packet that was dequeued from the selected second queue; and
in response to determining that the second packet is not stored in the reserved memory:
not dequeuing the second packet from the selected second queue.

7. The method of claim 4, wherein:
the utilization level is a first utilization level;
the threshold is a first threshold;
the method further comprises:
dynamically expanding, at the network device, the reserved memory by shrinking the shared memory in response to a second utilization level associated with the reserved memory meeting a second threshold, and
dynamically expanding, at the network device, the shared memory by shrinking the reserved memory in response to the second utilization level associated with the reserved memory meeting a third threshold.

8. The method of claim 4, further comprising:
determining, at the network device, whether there are sufficient resources in the shared memory to store a second packet in the shared memory; and
storing the second packet in the shared memory in one of the queues when it is determined that there are sufficient resources in the shared memory to store the second packet in the shared memory.

9. The method of claim 8, further comprising:
when it is determined that there are not sufficient resources in the shared memory to store the second packet in the shared memory,
determining, at the network device, whether there are sufficient resources in the reserved memory to store the second packet in the reserved memory, and
storing the second packet in the reserved memory in the one queue when it is determined that there are sufficient resources in the reserved memory to store the second packet in the reserved memory.

10. The method of claim 9, further comprising:
when it is determined that there are not sufficient resources in the reserved memory to store the second packet in the reserved memory,
dropping, at the network device, the second packet.

11. An apparatus, comprising:
one or more memory devices;
a packet processor device coupled to the one or more memory devices, the packet processor configured to:
process packets received via ports of a network device including determining to which egress interfaces, among a plurality of egress interfaces, packets are to be forwarded, and
enqueue packets to be transmitted in a plurality of queues in the one or more memory devices; and
a memory management device coupled to the one or more memory devices, the memory management device configured to:
determine a set of queues, from among the plurality of queues, for which packet dropping is enabled,
determine whether a utilization level of the memory meets a threshold, and
in response to determining that the utilization level of the memory meets the threshold:
randomly or pseudorandomly select a first queue from the set of queues for which packet dropping is enabled,
dequeue a first packet from the selected first queue, and
delete the first packet that was dequeued from the selected first queue.

12. The apparatus of claim 11, wherein:
the threshold is a first threshold; and
the memory management device is configured to, for each of at least some queues among the plurality of queues:
determine whether an amount of occupied memory corresponding to the queue meets a second threshold, and
include the queue among the set of queues for which packet dropping is enabled based on whether the amount of occupied memory corresponding to the queue meets the second threshold.

13. The apparatus of claim 12, wherein the memory management device is configured to include the queue among the set of queues for which packet dropping is enabled further based on whether configuration information associated with the queue indicates that dropping packets in the queue is permitted.

14. The apparatus of claim 11, wherein the memory management device is further configured to:
allocate a first pool of memory resources of the memory as shared memory for a plurality of egress interfaces, wherein available memory in the shared memory is available for any egress interfaces in the plurality of egress interfaces;
allocate a second pool of memory resources of the memory as reserved memory for at least some of the plurality of egress interfaces, including reserving, in the reserved memory, respective sub-pools for exclusive use by respective egress interfaces among the at least some of the plurality of egress interfaces; and for each of at least some of the queues, allocate a respective amount of the shared memory and a respective sub-pool in the reserved memory.

15. The apparatus of claim 14, wherein the memory management device is further configured to:

determine whether the first packet is stored in the reserved memory; and dequeue the first packet from the selected first queue in response to determining that the first packet is stored in the reserved memory.

16. The apparatus of claim 15, wherein the memory management device is further configured to, in response to determining that the utilization level of the memory meets the threshold:

randomly or pseudorandomly select a second queue from the set of queues for which packet dropping is enabled;

determine whether the second packet is stored in the reserved memory;

in response to determining that the second packet is stored in the reserved memory:

dequeue a second packet from the selected second queue, and delete the second packet that was dequeued from the selected second queue; and in response to determining that the second packet is not stored in the reserved memory:

not dequeue the second packet from the selected second queue.

17. The apparatus of claim 14, wherein:

the utilization level is a first utilization level;

the threshold is a first threshold;

the memory management device is further configured to:

dynamically expand the reserved memory by shrinking the shared memory in response to a second utilization level associated with the reserved memory meeting a second threshold, and dynamically expand the shared memory by shrinking the reserved memory in response to the second utilization level associated with the reserved memory meeting a third threshold.

18. The apparatus of claim 14, wherein the packet processor device is further configured to:

determine whether there are sufficient resources in the shared memory to store a second packet in the shared memory; and store the second packet in the shared memory in one of the queues when it is determined that there are sufficient resources in the shared memory to store the second packet in the shared memory.

19. The apparatus of claim 18, wherein the packet processor device is further configured to:

when it is determined that there are not sufficient resources in the shared memory to store the second packet in the shared memory, determine whether there are sufficient resources in the reserved memory to store the second packet in the reserved memory, and store the second packet in the reserved memory in the one queue when it is determined that there are sufficient resources in the reserved memory to store the second packet in the reserved memory.

20. The apparatus of claim 19, wherein the packet processor device is further configured to:

when it is determined that there are not sufficient resources in the reserved memory to store the second packet in the reserved memory, drop the second packet.

* * * * *